US012436900B2

(12) United States Patent
Levin et al.

(10) Patent No.: US 12,436,900 B2
(45) Date of Patent: Oct. 7, 2025

(54) SIGNAL FINGERPRINT

(71) Applicant: Google LLC, Mountain View, CA (US)

(72) Inventors: Alex Levin, San Jose, CA (US); Eric Joseph Herrmann, San Francisco, CA (US)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 18/430,218

(22) Filed: Feb. 1, 2024

(65) Prior Publication Data

US 2025/0252062 A1    Aug. 7, 2025

(51) Int. Cl.
 *G06F 13/10*   (2006.01)
(52) U.S. Cl.
 CPC .................................. *G06F 13/102* (2013.01)
(58) Field of Classification Search
 None
 See application file for complete search history.

(56) References Cited

U.S. PATENT DOCUMENTS

| | | | |
|---|---|---|---|
| 6,968,514 B2 | 11/2005 | Cooke et al. |
| 7,397,273 B1 | 7/2008 | Ng et al. |
| 7,904,864 B2 | 3/2011 | Huynh et al. |
| 9,672,184 B1 | 6/2017 | Jain et al. |
| 10,855,261 B2 | 12/2020 | Yang et al. |
| 11,002,787 B2 | 5/2021 | Wolff et al. |
| 2007/0250136 A1 | 10/2007 | Karunasiri et al. |
| 2008/0288666 A1 | 11/2008 | Hodges et al. |
| 2019/0121647 A1 | 4/2019 | Por |
| 2019/0277907 A1 | 9/2019 | Wolff et al. |
| 2021/0307189 A1 | 9/2021 | Lucero et al. |
| 2023/0116296 A1 | 4/2023 | Schneider et al. |

(Continued)

FOREIGN PATENT DOCUMENTS

| | | |
|---|---|---|
| JP | 2003256360 A | 9/2003 |
| JP | 2004005331 A | 1/2004 |

(Continued)

OTHER PUBLICATIONS

"International Search Report and Written Opinion", Application No. PCT/US2022/077955, Feb. 6, 2023, 16 pages.

(Continued)

*Primary Examiner* — Scott C Sun
(74) *Attorney, Agent, or Firm* — Colby Nipper PLLC

(57) ABSTRACT

Techniques and apparatuses are described that implement a signal fingerprint. In an example aspect, a fingerprint module can monitor signals distributed between a host board and peripherals during an operation performed by the host board. The fingerprint module can generate a signal fingerprint that represents characteristics of the signals that correspond to the operation. With the signal fingerprint, the fingerprint module can improve user experience by protecting the electronic device from anomalous behavior. The fingerprint module can also use the signal fingerprint to improve the user experience and improve system performance through appropriate electronic device component selection. The disclosed techniques and systems can therefore provide electronic device operation reliability, protect sensitive data, and improve electronic device performance while reducing costs and time associated with the design and testing phases of such devices.

20 Claims, 8 Drawing Sheets

(56) References Cited

U.S. PATENT DOCUMENTS

2024/0289525 A1* 8/2024 Shanmugasundaram ............
G06F 30/3308
2025/0251945 A1 8/2025 Levin et al.

FOREIGN PATENT DOCUMENTS

| | | |
|---|---|---|
| JP | 2005202705 A | 7/2005 |
| KR | 20070025994 | 3/2007 |
| WO | 2008068994 A1 | 6/2008 |
| WO | 2023064801 | 4/2023 |

OTHER PUBLICATIONS

"International Preliminary Report on Patentability", Application No. PCT/US2022/077955, Apr. 16, 2024, 12 pages.
"Non-Final Office Action", U.S. Appl. No. 18/045,717, filed Feb. 13, 2025, 13 pages.
"Final Office Action", U.S. Appl. No. 18/045,717, Aug. 20, 2025, 18 pages.
"Foreign Office Action", JP Application No. 2024-522111, Jun. 3, 2025, 4 pages.

\* cited by examiner

800 ─┐

Enable a plurality of peripherals for a configuration of a device, where each enabled peripheral is enabled from a group of peripherals corresponding to a peripheral type, where each group of peripherals is coupled to a host device
802

↓

Monitor, during an operation performed by the host device using at least one peripheral of the enabled plurality of peripherals, at least one signal that propagates between the host device and the at least one peripheral
804

↓

Generate a signal fingerprint for the operation performed by the host device using the at least one peripheral based on monitoring the at least one signal
806

*FIG. 8*

SIGNAL FINGERPRINT

BACKGROUND

Electronic devices are sold with various combinations of peripherals included in each device. Not only do different types of electronic devices include different peripherals, but electronic devices of the same type include different combinations of peripherals. Different versions of electronic devices often perform the same operations, such as by executing the same software. Anomalous behavior caused by software bugs and malware can pose a formidable threat to device operation. These digital adversaries can lead to device failures, data breaches, and compromised privacy. Anomalous behavior can also take the form of an electronic device spending an unexpected amount of time in a particular operating mode, which can result in suboptimal electronic device performance.

SUMMARY

Techniques and apparatuses are described that implement a signal fingerprint. In example aspects, a fingerprint module can monitor signals distributed between a host board and peripherals during an operation performed by the host board. The fingerprint module can generate a signal fingerprint that represents characteristics of the signals that correspond to the operation. With the signal fingerprint, the fingerprint module can improve user experience by protecting the electronic device from anomalous behavior. The fingerprint module can also use the signal fingerprint to improve the user experience and improve system performance through appropriate electronic device component selection. The disclosed techniques and systems can therefore provide electronic device operation reliability, protect sensitive data, and improve electronic device performance while reducing costs and time associated with the design and testing phases of such devices.

Aspects described below include a method performed by a fingerprint module for signal fingerprints. The method includes enabling a plurality of peripherals for a configuration of an electronic device. Each enabled peripheral is enabled from a group of peripherals corresponding to a peripheral type. Each group of peripherals is coupled to a host board. The method also includes monitoring, during an operation performed by the host board using at least one peripheral of the enabled plurality of peripherals, at least one signal that propagates between the host board and the at least one peripheral. The method additionally includes generating a signal fingerprint for the operation performed by the host board using the at least one peripheral based on monitoring the at least one signal. The signal fingerprint represents at least one characteristic of the at least one signal corresponding to the operation.

Aspects described below also include an apparatus comprising a fingerprint module configured to perform any of the described methods.

Aspects described below include a computer-readable storage medium comprising computer-executable instructions that, responsive to execution by a processor, cause a fingerprint module to perform any one of the described methods.

Aspects described below also include a system with means for generating and/or utilizing a signal fingerprint.

BRIEF DESCRIPTION OF DRAWINGS

Apparatuses for and Techniques for Implementing a Signal Fingerprint are Described with Reference to the Following Drawings. The Same Numbers are Used Throughout the Drawings to Reference Like Features and Components:

FIG. 8 depicts an example method for implementing aspects of a signal fingerprint.

DETAILED DESCRIPTION

Figure 1:
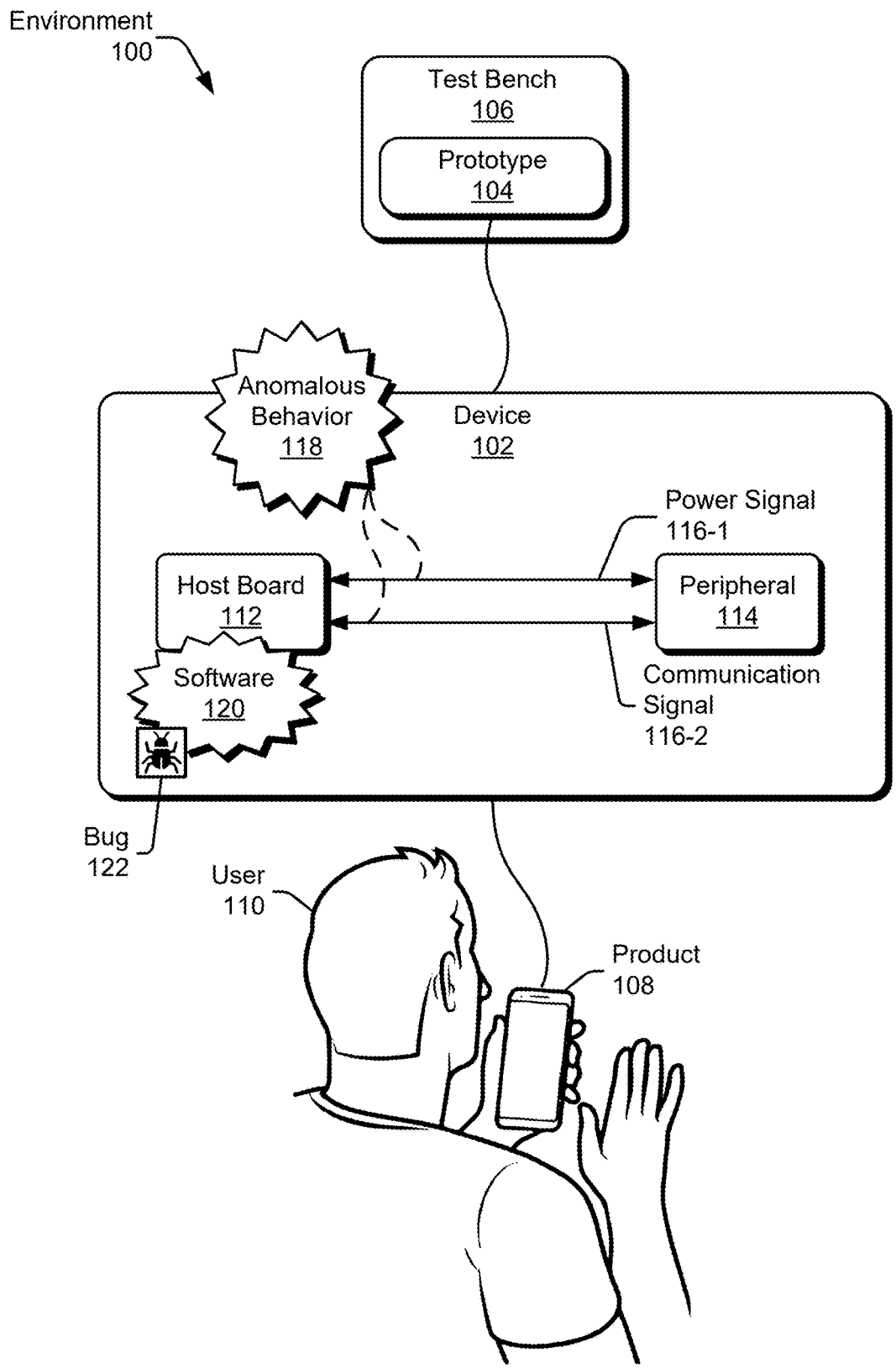
FIG. 1 illustrates an example environment in which a signal fingerprint can be implemented.

Electronic devices are sold with various combinations of peripherals included in each device. Not only do different types of electronic devices include different peripherals, but electronic devices of the same type include different combinations of peripherals. For example, different laptop computers can have different screen sizes and different types of storage. On top of that, different versions of the same brand and model of a device can include different peripherals. For example, the same model of a smartphone can be offered with different memory capacities and memories made by different manufacturers.

Different versions of electronic devices often perform the same operations, such as by executing the same software. For example, many different makes and models of smartphones run the same operating system and applications. While electronic devices typically execute the operations properly, anomalous behavior caused by software bugs and malware poses a formidable threat to device operation. Bugs are inadvertent errors in code that make devices operate unpredictably to the point of ceasing operation. Malware is malicious software that jeopardizes the reliability and security of infected devices. These digital adversaries lead to device failures, data breaches, and compromised privacy. Anomalous behavior can also take the form of an electronic device spending an unexpected amount of time in a particular operating mode, which can result in suboptimal electronic device performance.

Detecting and fixing anomalous behavior is an ongoing battle, especially due to all the different types of operations that are performed by electronic devices. For example, new software is continuously developed, and existing software is often upgraded. This battle is exacerbated by the fact that many different devices performing the same operations include many different combinations of peripherals. This makes it challenging to account for all the anomalous behavior caused by all the different software across all the different electronic devices.

To address this challenge, techniques are described that implement a signal fingerprint. In example aspects, a fingerprint module can monitor signals distributed between a host board and peripherals during an operation performed by the host board. The fingerprint module can generate a signal fingerprint that represents characteristics of the signals that correspond to the operation. With the signal fingerprint, the fingerprint module can improve user experience by protecting the electronic device from anomalous behavior. The fingerprint module can also use the signal fingerprint to improve the user experience and improve system performance through appropriate electronic device component selection. The disclosed techniques and systems can therefore provide electronic device operation reliability, protect sensitive data, and improve electronic device performance while reducing costs and time associated with the design and testing phases of such devices.

Operating Environment

FIG. 1 is an illustration of an example environment 100 in which signal fingerprints can be implemented. The environment 100 includes a device 102. In some cases, the device 102 is a prototype 104 that is tested as part of a product development process on a test bench 106. In other cases, the device 102 is a product 108 that is being used by a user 110.

The device 102 includes a host board 112 and at least one peripheral 114. The host board 112 represents a signal distribution unit and/or central operating unit of the device 102 and is coupled to the peripheral 114. For example, the host board 112 can be a PCB without any circuitry, a PCB with basic circuitry, a breadboard, a substrate, and/or any other host device. In operation, the host board 112 propagates at least one power signal 116-1 and/or at least one communication signal 116-2 between the host board 112 and the peripheral 114.

The peripheral 114 can be any operational electrical hardware that is part of an electronic device product. For example, the peripheral 114 can be a hardware component that is typically soldered to a substrate that includes other soldered components. Hardware components can include integrated circuits, embedded controllers, microcontrollers, memory chips, wireless local area network (WLAN) chips, audio codec components, universal serial bus (USB) controllers, and other components that are soldered to a device. The peripheral 114 can also be auxiliary hardware that can be inserted into a socket. Auxiliary hardware can include graphics processing units (GPUs), memory boards, central processing units (CPUs), Peripheral Component Interconnect (PCI) cards, and other auxiliary hardware that can be inserted into a socket. The peripheral 114 can further be an accessory that can be plugged into a port. Accessories can include external hard drives, web cameras, memory sticks, memory card readers, USB hardware, and any other accessory that can be plugged into a port. Different models of the same peripheral can provide options for soldering into a substrate, insertion into a socket, or connection to a port depending on the design of the peripheral 114.

Other example peripherals types include computer hardware components, circuit boards, microprocessors, embedded controllers, digital signal processors (DSPs), microchips, communication controllers, display controllers, and power management circuits. Example peripheral types also include internal hard drives, solid-state drives, optical drives, and other types of storage. Example peripheral types additionally include network controllers and interfaces, such as wired, wireless, optical, and other network interfaces and controllers. Example networks can include personal area networks (PANs), short-range wireless networks, local area networks (LANs), WLANs, mesh networks, wide area networks (WANs), wireless wide area networks (WWANs), virtual private networks (VPNs), Internet protocol networks, global positioning system networks, and other networks. Example peripheral types further include transceivers, displays, audio components (e.g., a speaker or a microphone), scanners, sensors (e.g., an inertial measurement unit (IMU) or a radar sensor), a global navigation satellite system (GNSS) receivers, amplifiers, filters, user interfaces, keyboards, touchpads, mice, power supplies, batteries, wireless charging receivers, and any other peripheral that can be used with an electronic device.

During operation of the device 102, anomalous behavior 118 can occur across the signals 116-1 and/or 116-2 provided between the host board 112 and the peripheral 114. For example, the host board 112 can send and receive a communication signal 116-2 while executing software 120. A bug 122 in the software 120 can cause anomalous behavior 118 by making the communication signal 116-2 diverge from normal operation. As another example of the anomalous behavior 118, the peripheral 114 can be a WLAN chip and the software 120 can be malware that has infected the device 102. The malware can increase an amount of data that is sent by the communication signal 116-2 to the WLAN chip when attempting to steal the private data of the user 110. An additional example of the anomalous behavior 118 can be based on the device 102 spending an unexpected amount of time in a specific operating mode. The specific operating mode can be a low-power mode, such as a standby mode, and the anomalous behavior 118 can be caused by the device sending a power signal 116-1 with less power than expected. The device 102 can monitor for and detect anomalous behavior 118 by applying the techniques associated with generating and/or utilizing a signal fingerprint, as further described in subsequent figures.

Signal Fingerprint

Figure 2:
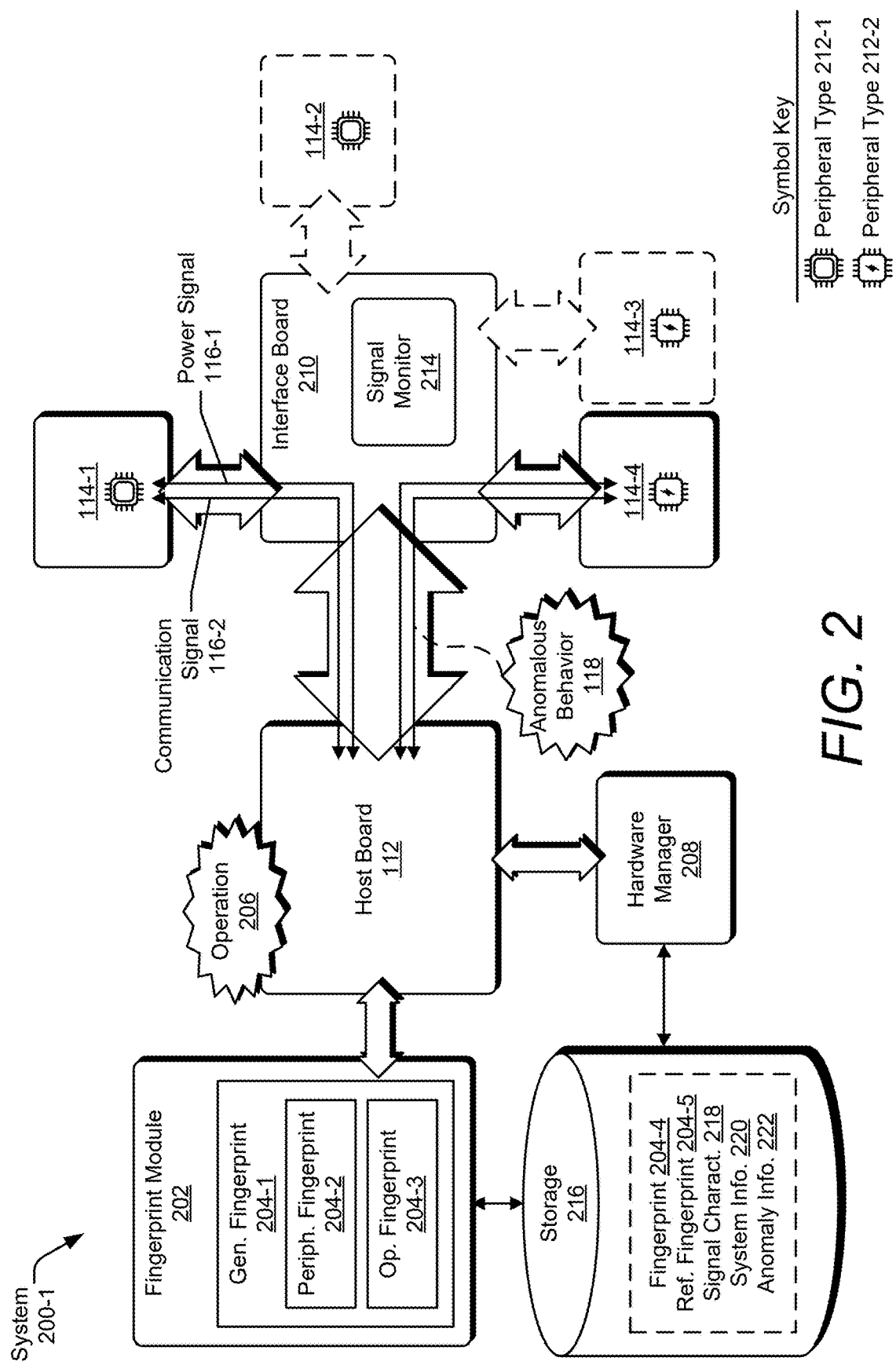
FIG. 2 illustrates an example system including a fingerprint module that generates a signal fingerprint for an operation performed by a host board.

FIG. 2 illustrates an example system 200-1 including a fingerprint module 202 that generates one or more signal fingerprints 204 for an operation 206 performed by the host board 112. The system 200-1 can operate as the prototype 104 or the product 108. The system 200-1 includes a hardware manager 208 and at least one interface board 210, both coupled to the host board 112. The system 200-1 also includes groups of the peripherals 114 coupled to the host board 112. Each group of the peripherals 114 corresponds to a peripheral type 212. For example, a first group of peripherals 114-1 and 114-2 can be of a first peripheral type 212-1 and a second group of peripherals 114-3 and 114-4 can be of a second peripheral type 212-2.

The hardware manager 208 enables a plurality of peripherals, such as peripherals 114-1 and 114-4, for a configuration of an electronic device, such as the device 102. For example, the hardware manager 208 can configure multiplexers or switches on the interface board 210 to route the signals 116 to enable the plurality of peripherals 114-1 and 114-4 according to a desired configuration for the device 102. When the system 200-1 operates as the prototype 104, at least one, some, or all of the remaining peripherals 114-2 and 114-3 can be disabled when the operation 206 is performed by the host board 112 with the enabled peripherals 114-1 and 114-4. When the system 200-1 operates as the product 108, the peripherals 114-2 and 114-3 and the interface board 210 may not be present.

The fingerprint module 202 monitors at least one signal 116 that propagates between the host board 112 and the at least one peripheral 114-1. This monitoring can occur while the host board 112 performs at least a portion of the operation 206 using at least one peripheral 114-1 of the enabled plurality of peripherals 114-1 and 114-2. The operation 206 can be the software 120, such as an application, a program, a browser, a website, an operating system, a service, a single-core operation, a multi-core operation, a word processing system, a game, a media player application, a media editing program, or any other operation performed on a device. The operation 206 can also be firmware that controls hardware devices, such as by allowing the peripherals 114 to interface with the host board 112.

The fingerprint module 202 can be an input/output (I/O) manager configured to monitor the one or more power signals 116-1, and the one or more communication signal 116-2, or some combination of power signals 116 and communication signals 116 distributed by the interface board 210 on power rails, data lines, control lines, and/or other lines to and from the peripherals 114. The fingerprint module 202 can monitor the signals 116 by measuring voltages and/or currents of at least one power signal 116-1 distributed between the host board 112 and the peripheral 114-1. The fingerprint module 202 can also monitor the signals 116 by monitoring at least one communication signal 116-2 communicated between the host board and the at least one peripheral. The communication signal can include a data signal, a timing signal, a clock signal, a control signal, an information signal, data packets, bits, or any other communication signal.

For example, the fingerprint module 202 monitors digital and/or analog aspects of the signals 116 between the host board 112 and the peripherals 114, as well as between different peripherals. The analog aspects can include power levels, power distribution, voltage levels, current amounts, frequencies, time durations, and other analog aspects of the signals 116. The digital aspects can include data usage, data type, packet header information, packet contents, data source information, data destination information, timestamp information, and other digital aspects.

In an implementation, the fingerprint module 202 can use signal tracing to monitor the signals 116. Signal tracing can be used to acquire waveform and/or time data from the signals 116 in real-time while the host board 112 is performing the operation 206. According to a possible embodiment, the interface board 210 can include a signal monitor 214, such as a signal inspector. Generally speaking, the signal monitor 214 includes circuitry for monitoring the signals 116 via signal tracing. The signal monitor 214 can additionally or alternatively be included on the host board 112, included as part of the fingerprint module 202, and/or distributed throughout the system 200-1. The signal monitor 214 traces the signals 116 at one or more points as they progress along paths in the system 200-1 while monitoring the behavior of the signals 116. While doing so, the signal monitor 214 measures properties, such as the analog aspects, digital aspects, and other properties of the signals 116, and provides corresponding data to the fingerprint module 202.

The fingerprint module 202 generates the signal fingerprint 204, such as a generated signal fingerprint 204-1, for the operation 206 performed by the host board 112 using the enabled peripherals 114-1 and 114-4. The signal fingerprint 204 can also be referred to as a fingerprint 204. The signal fingerprint 204 is based on the analog and/or digital aspects of the signals 116 between the host board 112 and the peripherals 114. The signal fingerprint 204 represents characteristics of the one or more signals 116 corresponding to the operation 206. The signal fingerprint 204 can be based on how the operation 206 influences power consumption and other aspects of signals 116 traced throughout the system 200-1. The signal fingerprint 204 can also be based on time-variant information, such as over a period of time, and/or based on an instant in time, such as a snapshot of the voltage, current, communications, data, and so forth. Different fingerprints 204 can be generated for different operations 206 and/or for different configurations of the system 200-1 (e.g., for different enabled groups of peripherals 114).

According to a possible implementation, the signal fingerprint 204 can be an analog electrical fingerprint that is based on the measured voltages, currents, data, and other aspects of the signals 116. The fingerprint 204 can be considered an analog electric fingerprint in that it represents analog aspects of electrical signals 116 between the host board 112 and the peripherals 114, as well as between different peripherals 114. The analog aspects can include power, voltage, current, frequency, time duration, and other analog aspects of the signals 116. According to a possible embodiment, an analog electrical fingerprint can represent primarily or only analog aspects of the signals 116. While the signal fingerprint 204 may include only analog aspects of the electrical signals, the signal fingerprint 204 itself can comprise digital data that represents the analog aspects. The fingerprint 204 can also include analog characteristics that represent the analog aspects of the signals 116.

According to a possible implementation, the signal fingerprint 204 is a peripheral signal fingerprint 204-2 (periph. fingerprint 204-2), which represents characteristics of the signals 116 corresponding to a single peripheral 114-1 during the operation 206. Multiple peripheral fingerprints 204-2 or a single peripheral fingerprint 204-2 can represent characteristics of multiple signals 116 corresponding to a peripheral 114-1 during the operation 206. There can also be one or multiple peripheral fingerprints 204-2 generated to capture multiple different operations performed by a single peripheral 114-1.

According to another possible implementation, the signal fingerprint 204 is an operation signal fingerprint 204-3 (op. fingerprint 204-3) that is based on monitoring one or more signals 116 between the host board 112 and the plurality of enabled peripherals 114-1 and 114-4 during the operation 206. The operation signal fingerprint 204-3 can represent multiple signals 116 on its own, can be a combination of multiple peripheral signal fingerprints 204-2, can be a combination of fingerprints 204 for groups of peripherals, and/or can be any fingerprint or combination of fingerprints 204 that represents at least one signal 116 when executing the operation 206 for a configuration of the system 200-1.

The system 200-1 can include a storage 216 that stores data and applications that can be accessed by the fingerprint module 202 and the hardware manager 208. The storage 216 can be local or remote storage that can provide persistent and/or non-transitory data storage, which can be in contrast to mere signal transmission. For example, the storage 216 can be one or more of, and/or a combination of any of, a computer-readable medium, one or more memory devices, random access memory (RAM), non-volatile memory (e.g., any one or more of a read-only memory (ROM), flash memory, EPROM, EEPROM, etc.), a disk storage device, a magnetic storage device, an optical storage device, a hard disk drive, a recordable and/or rewriteable compact disc (CD), any type of a digital versatile disc (DVD), a mass storage medium device (storage medium), a networked storage device, cloud storage, and/or any other type of storage.

The storage 216 can store stored fingerprints 204-4, reference fingerprints 204-5 (ref. fingerprint 204-5), signal characteristics 218 (signal charact. 218), system information 220 (system info. 220), anomaly information 222 (anomaly info. 222), or some combination thereof. The storage 216 can also store system data, device applications, an operating system, control applications, software applications, signal-processing code, control module code, code that is native to a particular device, a hardware abstraction layer for a particular device, other types of information and software, and/or combinations thereof related to operational aspects of the system 200-1.

The fingerprint module 202 can log and store signal characteristics 218 of the signals 116 at various points in the system 200-1. The signal characteristics 218 can include the digital and analog aspects of the signals 116 described above. The fingerprint module 202 can also log and store system information 220 during execution of the operation 206. The system information 220 can include information about the operation 206, the status of system registers, information about the peripherals 114, memory usage information, operating system information, firmware information, hardware information, and any other information about the system 200-1. The fingerprint module 202 can use the signal characteristics 218 and the system information 220 to generate the signal fingerprint 204.

According to a possible embodiment, the fingerprint module 202 monitors signals 116 during different operations 206 performed by the host board 112 and generates and stores corresponding different signal fingerprints 204-4 in the storage 216 for each operation 206. As an example, the storage 216 can store the different signal fingerprints 204-4 in a look-up-table (LUT). The different operations 206 can include an attempted execution of a previously executed operation, execution of different software versions, execution of different software types, and other different operations.

In an implementation, the fingerprint module 202 generates and stores a reference signal fingerprint 204-2 that is used to detect anomalous behavior 118, such as an anomaly of the operation 206. In an example implementation, the fingerprint module 202 determines that the current operation 206 is a different operation from a previous operation based on detecting the anomalous behavior 118. For example, to generate the reference signal fingerprint 204-2, the fingerprint module 202 monitored the signals 116 during a previous operation 206 performed by the host board 112. The fingerprint module 202 generated and stored the reference signal fingerprint 204-5 based on signal characteristics 218 determined from monitoring the signals 116. The fingerprint module 202 can later detect the anomalous behavior 118 based on comparing the real-time generated signal fingerprint 204-1 to the previously stored reference signal fingerprint 204-5.

A significant difference between the currently generated signal fingerprint 204-1 and the reference signal fingerprint 204-5 can indicate a high probability of the presence of the anomalous behavior 118. For example, the detected anomalous behavior 118 can indicate the current operation 206 is different from the previous operation in some manner. The difference can be based on a change in power, voltage, data usage, or other change in the signals 116 over a threshold amount of change can indicate an anomaly that results from the current operation 206 being different from an earlier operation 206.

In a possible embodiment, the fingerprint module 202 blocks execution of the current operation 206 by the host board 112 based on the current operation 206 being a different operation from an expected operation, such as based on detecting the anomalous behavior 118. For example, the operation 206 can be malware masquerading as desired software, can be an operation infected with a virus, can be a corruption of an earlier operation, can be an operation with a bug (e.g., an error), can be a pirated version of an operation, and/or can be any other operation that is different than an expected operation. The fingerprint module 202 blocks the execution of the operation 206 to avoid device malfunction, to avoid data theft, to mitigate software privacy, and to otherwise mitigate or prevent the anomalous behavior 118.

According to a specific non-limiting example, an operation 206 in the form of a game can typically consume the same amount of resources, such as power, local area network data, memory storage, etc. when the game starts. A reference signal fingerprint 204-5 of the game can be based on the game's usage of resources. The reference signal fingerprint 204-5 can be generated over a period of time to establish a pattern of usage. If a rogue version of the game is launched in an attempt to steal personal data, the rogue version can be detected because its signal fingerprint 204 will show it behaves differently compared to the legitimate game because it is using different resources. The fingerprint module 202 can stop the rogue version, warn the user, provide feedback to developers, and/or otherwise respond to the rogue version.

In a possible embodiment, the fingerprint module 202 can output anomaly information 222 about the anomalous behavior 118. For example, the fingerprint module can store the anomaly information 222 in storage, send the anomaly information 222 to other components of the system 200-1 for further processing, provide the anomaly information 222 to a user 110 (e.g., inform the user 110 via a display, an audio alert, a text message, an email message), and/or otherwise output the anomaly information 222. According to a possible example, the anomaly information 222 can be a warning sent to users 110 about a rogue software version (e.g., a buggy or malicious software version) of the operation 206. The warning can include some sort of identifier of the rogue version, which can be a software version identifier, software name, or other information.

If the anomaly information 222 is gathered in a lab environment (e.g., by operating the prototype 104 or the product 108), the anomaly information 222 can be sent to the user 110's product 108. In this example, the anomaly information 222 can include a full or stripped-down version of the signal fingerprint 204 and/or can include other information, such as a software version, a software identifier, characteristics of the operation 206, and/or other information. The product 108 can use the anomaly information 222 to detect an event or signal that is unique to the rogue version of the software and/or block the rogue version. Another possible implementation of the system 200-1 is described with respect to FIG. 3.

Figure 3:
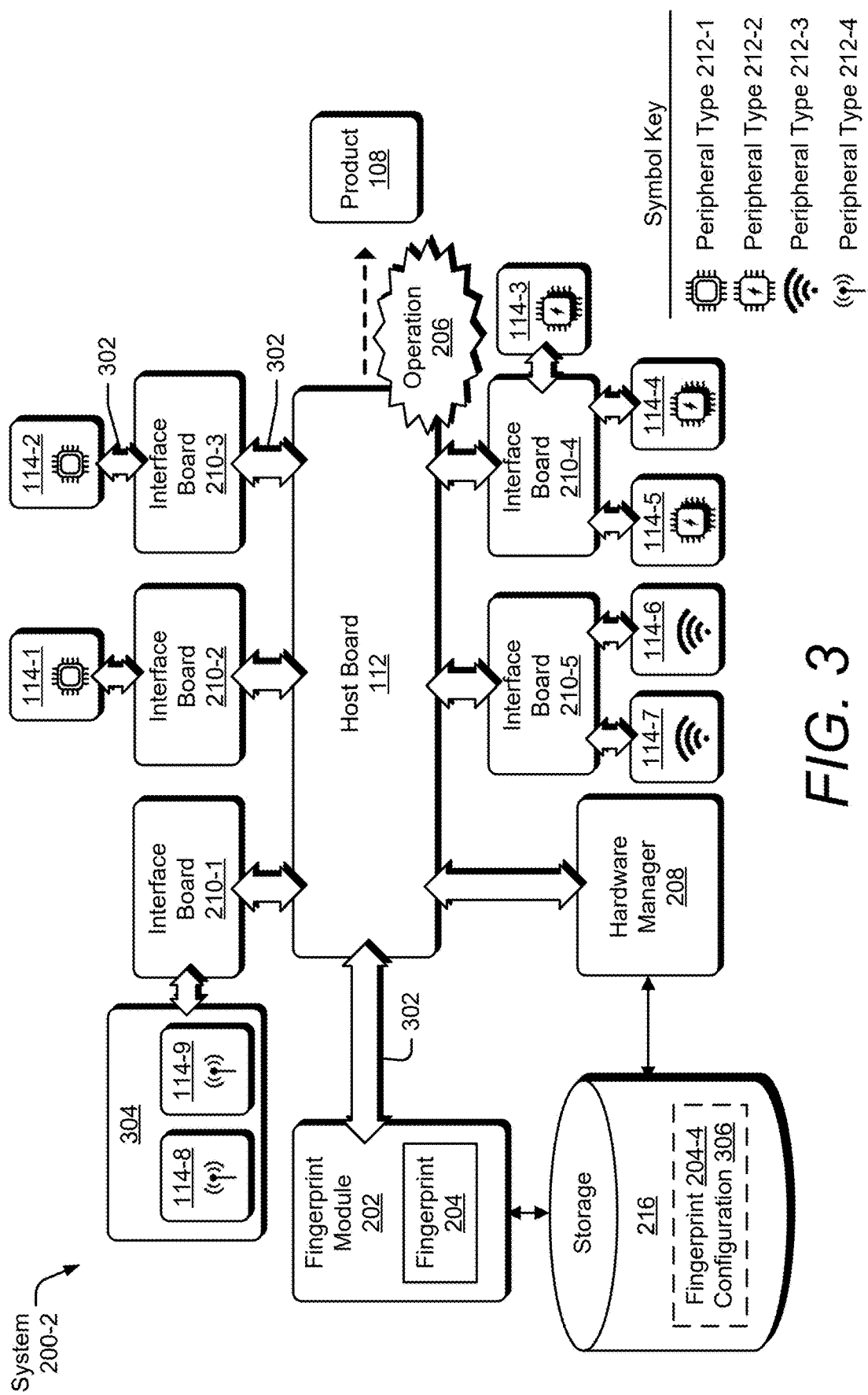
FIG. 3 illustrates another example system including a fingerprint module that generates a signal fingerprint for an operation performed by a host board.

FIG. 3 illustrates an example system 200-2 including a fingerprint module 202 that generates a signal fingerprint 204 for an operation 206 performed by the host board 112. In the depicted configuration, the system 200-2 includes multiple interface boards 210-1 to 210-5 that couple the peripherals 114-1 to 114-9 to the host board 112. The system 200-2 can also include other elements of the system 200-1. The peripherals 114-1 to 114-9 can represent different peripheral types 212-1 to 212-4. In this example, the peripheral type 212-1 represents a processor, the peripheral type 212-2 represents a power management circuit, the peripheral type 212-3 represents a WLAN chip, and the peripheral type 212-4 represents a cellular communications board. By appropriately configuring the interface boards 210-1 to 210-5, the hardware manager 208 can enable different combinations of the peripherals 114-1 to 114-9 to allow the fingerprint module 202 to generate fingerprints 204 during the operation 206 performed by the host board 112 using the peripherals 114 that match a configuration of the product 108.

The fingerprint module 202, the hardware manager 208, the host board 112, the interface boards 210, and the peripherals 114 can be coupled to each other via interconnects 302. The interconnects 302 propagate the signals 116 between the host board 112, the interface boards 210, and the peripherals 114, and also provide for communication between the host board 112, the fingerprint module 202, and the hardware manager 208. The interconnects 302 can include predefined connectors, common connectors, particular types of connectors, USB-type connectors, PCIe connectors, Ethernet connectors, and/or any other connectors depending on the implementation of the system 200-2. Additionally or alternatively, the interconnects 302 include connector interfaces that can include conductors for predefined input/output (I/O) signal ports, one or more power rails, and/or control lines that enable the hardware manager 208 to control or configure circuitry of the interface boards 210. Other types of interconnects 302 include physical connectors on the hardware manager 208, on the host board 112, on the interface boards 210, and on the peripherals 114. The interconnects 302 can also include any facility for electronic communication including, but not limited to, a bus, a crossbar, a fabric, a switching fabric, a grid, one or more wires that carry electronic signals, one or more wires that carry power, voltage, and/or current signals, a network, wired network interfaces, wireless network interfaces, and/or any other interconnects that can couple devices, boards, circuits, and other electronic elements to each other.

The fingerprint module 202 and the hardware manager 208 can be implemented as hardware, software, or a combination thereof. While the fingerprint module 202 and the hardware manager 208 are shown as single separate components, the fingerprint module 202 and the hardware manager 208 can be combined into one component. Each of the fingerprint module 202 and the hardware manager 208 can also be separated into separate components that can perform similar or different functions. The fingerprint module 202 and the hardware manager 208 can each include one or more dedicated hardware circuits and/or can be software stored on computer-readable media. One or multiple fingerprint modules 202 and hardware managers 208 can be directly coupled to the interface boards 210, distributed throughout the system 200-2, and/or remotely coupled to the system 200-2, such as via a network. In some aspects, the fingerprint module 202 and hardware manager 208 can each be a printed circuit board (PCB) coupled to the host board 112. In other aspects, the fingerprint module 202 and the hardware manager 208 can each be an integrated circuit (IC) and/or other circuitry included on the host board 112.

In operation, the hardware manager 208 can enable and disable peripherals 114 and the fingerprint module 202 can evaluate the performance of the system 200-2 during the operation 206 based on the currently enabled peripherals. In aspects, the system 200-2 can be a modular system validation platform for electronic devices and the hardware manager 208 can control configuration and reconfiguration of the system 200-2. For example, the hardware manager 208 can determine or select respective configuration information to provide configurations of one or more interface boards 210. In some cases, the hardware manager 208 also includes or manages a power source that powers a control plane for configuration aspects of any boards and peripherals included in the system 200-2. The control plane can include circuitry that powers and communicates with board management logic on the host board 112, the interface boards 210, and the peripherals 114. The hardware manager 208 can use the control plane to configure the system 200-2 independent of functional circuitry being tested.

As discussed above, the host board 112 can be a PCB without any circuitry, a PCB with basic circuitry, a breadboard, a substrate, and/or any other device that can host and distribute power and communication signals to and between peripherals 114, as well as receive power and communication signals from peripherals 114. The host board 112 can also include foundation circuitry, such as a bus, a power supply, a power connector, sockets, storage controllers, ports, a basic input/output system (BIOS), a microprocessor, a clock circuit, expansion slots, and/or other circuitry that can provide basic operations for a host board. Some or all of the foundation circuitry can also be provided by peripherals 114 coupled to the host board 112, where the foundation circuitry can be enabled and disabled for different iterations of execution of the operation 206. In possible implementations, the host board 112 can include a system on a chip (SoC), a processor IC, a memory IC, a power system, power system ICs, memory, control circuitry, and/or other components of an electronic device with or without the peripherals 114. In some aspects, the host board 112 may represent a core platform of a particular processor or SoC manufacturer.

Generally, the interface boards 210 can include reconfigurable interface circuitry designed to interface the host board 112 to one or more of the peripherals 114. For example, the interface boards 210 can include circuitry that can be reconfigured to enable and disable different peripherals using the same interface board 210 to operate with the host board 112. The interface boards 210 can also include circuitry, such as circuitry of the signal monitor 214, that allows the hardware manager 208 to monitor the power and communication signals that are being interfaced between the host board 112 and the peripherals 114. In some implementations, the circuitry of the interface boards 210 can enable configuration and/or monitoring of electrical nets, nodes, or paths (e.g. signal lines or power rails on internal PCB layers) that are not exposed on external layers or contacts (e.g., test points or connector headers) of the interface boards 210 or peripherals 114. The interface boards 210 can further include enhanced yet predefined interfaces, which may include standardized data interfaces and additional sideband signaling, such as for configuration of the interface boards 210. Thus, the interface boards 210 can enable control (e.g., level shifting or power sequencing) and measurements of electrical signals 116 that are not typically exposed by preceding host boards, peripherals, or adapter boards.

The interface boards 210 can provide power signal measurements on power rails for individual components as opposed to a summary measurement over a batch of components. Likewise, the interface boards 210 can enable analog monitoring of logical communication signals to attached peripherals 114 to confirm expected behavior or monitor for voltage or current leakage issues. The electrical paths or nets of the interface boards 210 being measured or monitored may not be exposed on external layers or contacts of the interface boards 210. For example, test headers, leads, pads, or additional test equipment may not be needed to debug or characterize electrical interfaces between the host board 112 and the peripherals 114. The fingerprint module 202 can generate the signal fingerprints 204 based on information about the monitored signals and signal measurements received from the interface boards 210.

In some aspects, some interface boards 210 can provide novel peripheral interfaces by combining multiple existing peripheral connectors into a single board. The interface boards 210 can also include multiple connectors (e.g., with multiplexed power and/or signaling) to interface multiple peripherals with the host board 112. For example, the interface boards 210 can include multiplexing circuitry (or switching circuitry) that allows disabling and enabling of different peripherals by switching a signal path between the host board 112 and the different peripherals.

The system 200-2 can enable an interchange of different peripherals 114 using the same set of the interface boards 210. Further, the interface boards 210 and peripherals 114 can be added, removed, or swapped (e.g., hot-swapped while the host board 112 is powered) to rapidly test and evaluate (compared to traditional reference platforms) different configurations of a device 102 modeled by the system 200-2.

At least some of the peripherals 114 can be detachably coupled to the host board 112 via the interface boards 210, such as via user-detachable connectors that can be connected and disconnected with a user's hands or using a simple tool (e.g., without requiring soldering). While the peripherals 114 may be detachably coupled to the host board 112, at least some of the peripherals 114 may be fixed to an intermediary device, such as soldered to a peripheral board 304, such as a PCB, that includes or is attached to an interface board 210-1. In this example, one or more peripherals 114-8 and 114-9 can be cellular communication chipsets from different manufacturers mounted on a single peripheral board 304. Multiplexing circuitry, either on the attached interface board 210-1 or on the peripheral board 304, can be implemented to switch between the different cellular communication chipsets for fingerprint generation.

The peripherals 114 can also include some peripherals fixedly coupled to the host board 112, such as soldered or directly socketed onto a PCB, and at least one peripheral of the same type detachably coupled to the host board 112, such as via an interface board 210. The peripherals 114 can additionally include some peripherals locally coupled to the host board 112 and other peripherals remotely coupled to the host board 112. For example, locally coupled peripherals can be proximate to the host board 112 in a common housing, on a same table, or otherwise locally coupled, and remote peripherals can be exterior to the housing but on the same table, can be in a cabinet, can be in a drawer, can be in a closet, can be in another room, can be in another building, or can be otherwise relatively remote to the host board 112. Thus, remotely coupled peripherals can be relatively remote when compared to locally coupled peripherals. In some instances, some peripherals can be coupled to the host board 112 via interface circuitry and the other peripherals may not be coupled to the host board 112 via the interface circuitry.

The storage 216 can store a configuration 306 of the device 102. The configuration 306 can include information and data about the configuration of the device 102, such as the product 108. The configuration 306 provides the information and data for use by the hardware manager 208. For example, the configuration 306 can include requirements of a product 108, can include identities of the expected host board 112, the expected interface boards 210 attached to the host board 112, and the expected peripherals 114 attached to the interface boards 210, and can include other configuration data. In some aspects, the identities of the expected host board 112, interface boards 210, and peripherals 114 are stored as a digital identification code. The configuration 306 can also include the power and communication requirements of each peripheral 114 that may be coupled to the system 200-2.

In operation, the hardware manager 208 can enable a first plurality of the peripherals 114 coupled to the host board 112. The first enabled plurality of peripherals can include the first peripheral 114-1 having the first peripheral type 212-1. The peripherals 114 that are enabled as part of the first enabled plurality of peripherals can correspond to the configuration 306. In general, a peripheral 114 can correspond to the configuration 306 if the peripheral 114 matches a peripheral used or desired for use in the product 108. The fingerprint module 202 can monitor signals and generate the signal fingerprint 204 for the operation 206 performed by the host board 112 using the first enabled plurality of peripherals.

The hardware manager 208 can enable a second plurality of the peripherals 114, which can also correspond to the configuration 306. The second enabled plurality of peripherals can have at least one different enabled peripheral from the first enabled plurality of peripherals. For example, the second enabled plurality of peripherals can have an enabled peripheral that was not enabled in the first enabled plurality of peripherals, while a peripheral that was enabled in the first enabled plurality of peripherals may be disabled. The fingerprint module 202 monitors signals and generates the signal fingerprint 204 for the operation 206 performed by the host board 112 using the second enabled plurality of peripherals. The fingerprint module 202 stores respective signal fingerprints 204-4 each time the operation 206 is performed on different pluralities of the peripherals 114.

The hardware manager 208 can selectively distribute, via interface circuitry, such as circuitry on the interface boards 210, signaling between the host board 112 and enabled peripherals 114. The signaling can be communication signaling and/or power signaling. The hardware manager 208 can thus enable peripherals 114 by altering at least one operating characteristic of interface circuitry on the interface boards 210 to enable operation of peripherals 114 with the host board 112. Altering at least one operating characteristic of the interface circuitry can include switching a signal path between the host board 112 and one peripheral to a signal path between the host board 112 and another peripheral via multiplexing to disable the one peripheral and enable the other peripheral. For example, the interface boards 210 and the peripheral board 304 can include multiplexing circuitry, where the peripheral 114-1 is disabled and the peripheral 114-2 is enabled by switching a signal path between the host board 112 and the peripheral 114-1 to a signal path between the host board 112 and the peripheral 114-2 using the multiplexing circuitry. The hardware manager 208 can program the multiplexing circuitry to switch the signal path via software selection of a subset of the peripherals 114.

According to a possible embodiment, the hardware manager 208 can receive the configuration 306. For example, the hardware manager 208 can receive the configuration 306 from the storage 216 or otherwise receive the configuration 306. The hardware manager 208 can enable a plurality of the peripherals 114 based on the configuration 306. The fingerprint module 202 can monitor signals and generate fingerprints 204 for the operation 206 performed by the host board 112 using peripherals 114 that match the configuration 306. An example of the fingerprint module 202 in the form of a machine-learned model used for generation and evaluation of the fingerprints 204 is described with respect to FIG. 4.

Figure 4:
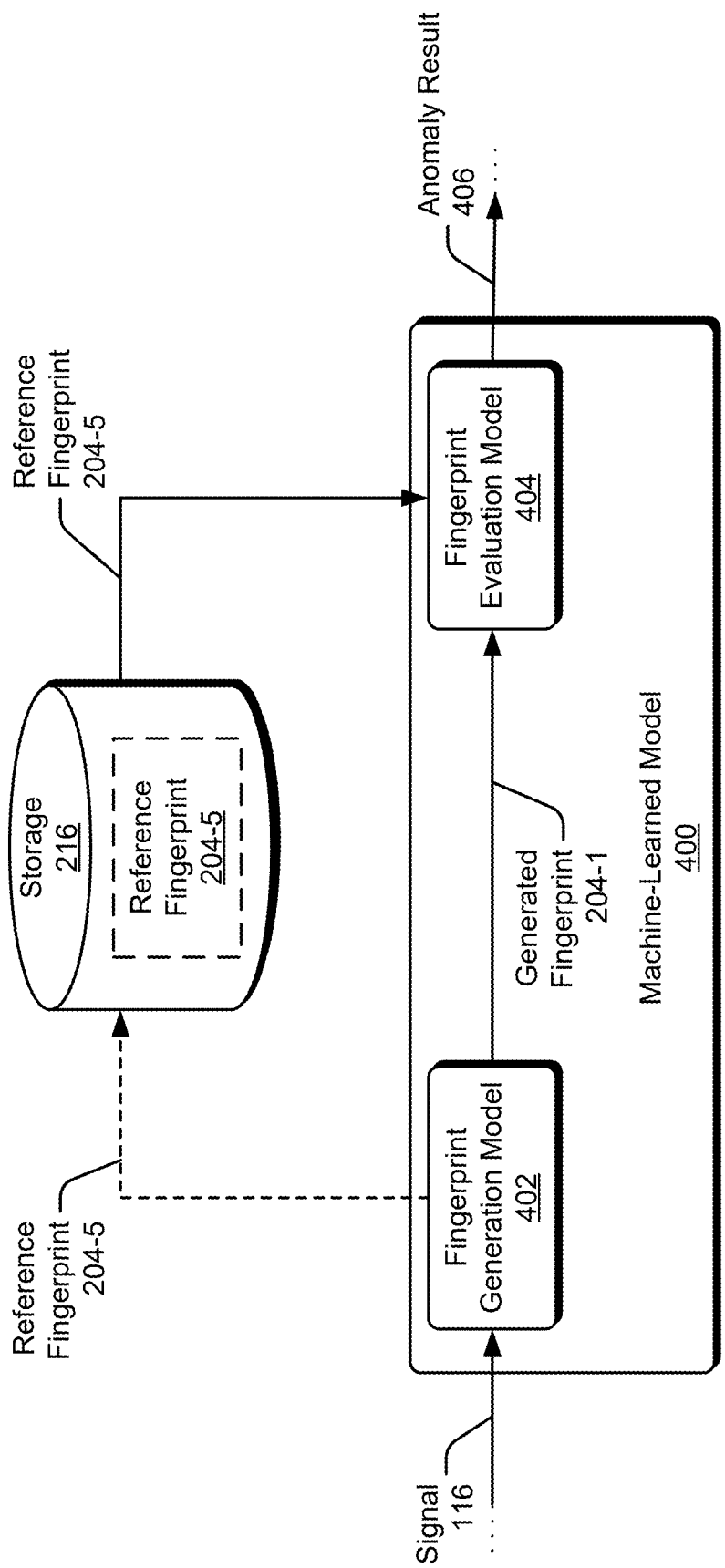
FIG. 4 is an example implementation of a fingerprint module realized as a machine-learned model for generating a signal fingerprint and detecting anomalous behavior.

FIG. 4 is an example implementation of the fingerprint module 202 realized as a machine-learned model 400 for generating and/or evaluating a signal fingerprint 204. The machine-learned model 400 can represent multiple machine-learned models or a single machine-learned model with multiple stages. In the depicted configuration, the machine-learned model 400 is shown to include a fingerprint generation model 402 and a fingerprint evaluation model 404.

The fingerprint generation model 402 can represent a first stage of the machine-learned model 400. In example implementations, the fingerprint generation model 402 can include one or more types of regression models, such as a single linear regression model, multiple linear regression models, logistic regression models, step-wise regression models, multi-variate adaptive regression splines, locally estimated scatterplot smoothing models, and so forth. In general, the fingerprint generation model 402 is trained using supervised learning to generate a fingerprint 204 having a set of features that enable the anomalous behavior 118 to be detected. The features can be extracted from or calculated based on the analog and/or digital aspects of the signal 116, which are previously described above.

The fingerprint evaluation model 404 can represent a second stage of the machine-learned model 400. In example implementations, the fingerprint evaluation model 404 can also include one or more types of classification models, such as a binary classification model, a multi-class classification model, multi-label classification, and so forth. In general, the fingerprint evaluation model 404 is trained using supervised learning to detect the anomalous behavior 118 based on the generated fingerprint 204-1 and the reference fingerprint 204-5.

Each one of the fingerprint generation model 402 and the fingerprint evaluation model 404 is implemented using one or more neural networks. A neural network includes a group of connected nodes (e.g., neurons or perceptrons), which are organized into one or more layers. As an example, the fingerprint generation model 402 and/or the fingerprint evaluation model 404 includes a deep neural network, which includes an input layer, an output layer, and one or more hidden layers positioned between the input layer and the output layers. The nodes of the deep neural network can be partially-connected or fully-connected between the layers.

In some implementations, the neural network is a recurrent neural network (e.g., a long short-term memory (LSTM) neural network) with connections between nodes forming a cycle to retain information from a previous portion of an input data sequence for a subsequent portion of the input data sequence. In other cases, the neural network is a feed-forward neural network in which the connections between the nodes do not form a cycle. Additionally or alternatively, the fingerprint generation model 402 and/or the fingerprint evaluation model 404 includes another type of neural network, such as a convolutional neural network.

Through supervised learning, the machine-learned model 400 is trained to detect anomalous behavior 118 based on the signal 116 (or the signal characteristics 218). More specifically, the fingerprint generation model 402 and the fingerprint evaluation model 404 are trained together such that the fingerprint generation model 402 can generate a meaningful fingerprint 204 and the fingerprint evaluation model 404 can recognized the anomalous behavior 118 within the generated fingerprint 204-1. In general, the supervised learning can use simulated (e.g., synthetic) data or measured (e.g., real) data for training purposes.

During operation, the fingerprint generation model 402 at least receives the one or more monitored signals 116 as input data and generates one or more signal fingerprints 204 (e.g., one or more generated fingerprints 204-1) as output data. In some situations, the signal fingerprint 204 is stored as a reference fingerprint 204-5 within the storage 216, as further described below. The fingerprint evaluation model 404 evaluates the generated fingerprint 204-1 based on a previously generated reference fingerprint 204-5.

For reference signal fingerprint 204-5 generation, the fingerprint generation model 402 receives at least one signal 116 that propagates between the host board 112 and a peripheral 114 during the operation 206 or the signal characteristics 218 generated by the signal monitor 214. Optionally, the fingerprint generation model 402 can also receive other information about the system 200, such as the information about the operation 206, the system information 220, the configuration 306, and other information about the system 200 for generation of the signal fingerprint 204. The fingerprint generation model 402 generates feature data corresponding to characteristics 218 of the signals 116 and other information (if available). The generated fingerprint 204-1 can be provided to the storage 216 and later used as a reference fingerprint 204-5. The generation of the reference fingerprint 204-5 can be done during lab testing, such as on a test bench 106 by a manufacturer, or outside of a lab, such as by the product 108. Any generated fingerprints 204 can include a set of numbers that correspond to different features that the fingerprint generation model 402 is trained to recognize from the received signal 116. The stored reference fingerprints 204-5 can be used for future training and updated during normal operation. The fingerprint generation model 402 or the storage 216 labels the reference fingerprint 204-5 based on the operation 206 and the configuration of the device 102. This enables the machine-learned model 400 to reference an appropriate reference fingerprint 204-5 for detecting anomalous behavior 118. In particular, it enables the fingerprint evaluation model 404 to utilize a reference fingerprint 204-5 that corresponds to a current operation 206 and/or configuration of the device 102.

To detect anomalous behavior 118 within a current operation 206, the fingerprint generation model 402 receives the signal 116, generates the fingerprint 204, and provides the generated signal fingerprint 204-1 to the fingerprint evaluation model 404. The fingerprint evaluation model evaluates whether the currently generated signal fingerprint 204-1 is associated with an anomaly or not based on a comparison of the generated signal fingerprint 204-1 with the reference signal fingerprint 204-5. For example, the fingerprint generation model 402 generates a plurality of generated signal fingerprints 204-1, such as by generating the signal fingerprints 204-1 over time when executing the same operation 206 with the same combination of peripherals 114. The fingerprint evaluation model 404 establishes a relationship between each of the plurality of generated signal fingerprints 204-1 and the reference signal fingerprint 204-5. The fingerprint evaluation model 404 detects the anomalous behavior 118 based on the relationship (e.g., difference) between each of the plurality of generated signal fingerprints 204-1 and the reference signal fingerprint 204-5. The fingerprint evaluation model 404 outputs an anomaly result 406 identifying the anomalous behavior 118, if detected.

In general, the models 402 and 404 can be regression models, classification models, clustering models, dimensionality reduction models, reinforcement learning models, or any other machine-learned models. According to a possible implementation, the fingerprint generation model 402 can be a regression model and the fingerprint evaluation model 404 can be a regression model or a classification model. Generally, these models can be trained using supervised or unsupervised learning. The models 402 and 404 can learn patterns and relationships in collected data, such as by adjusting internal parameters, and can generate fingerprints 204 and detect anomalous behavior 118 based on the patterns and relationships.

Other implementations are also possible in which the machine-learned model 400 includes the fingerprint generation model 402 and does not include the fingerprint evaluation model 404. In this case, the fingerprint evaluation model 404 can instead employ heuristic techniques to detect the anomalous behavior 118 based on the generated fingerprint 204-1. As an example, the fingerprint evaluation model 404 can be implemented using comparison circuitry, which computes a difference between the generated fingerprint 204-1 and the reference fingerprint 204-5 and compares this difference to criteria to detect the anomalous behavior 118. The fingerprint 204 can also be evaluated to optimize a configuration and/or operating mode of the device 102, as further described with respect to FIG. 5.

Figure 5:
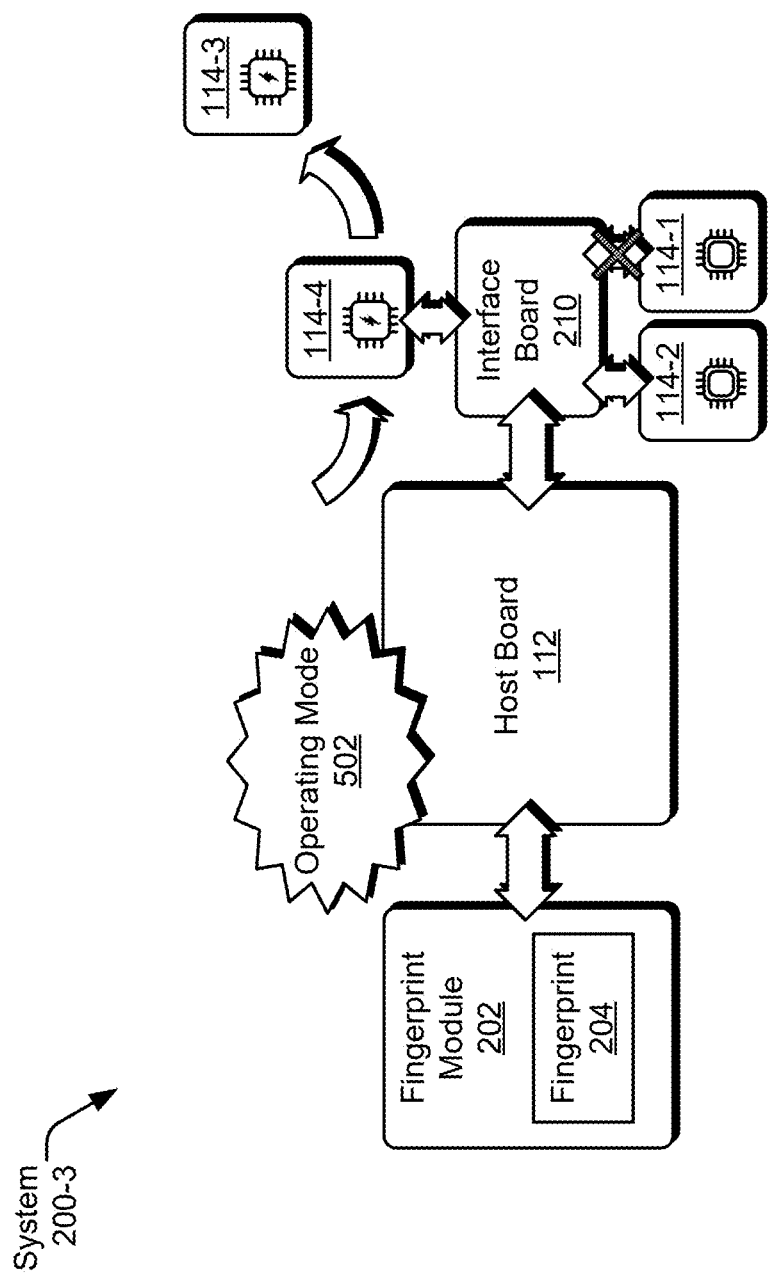
FIG. 5 illustrates an example implementation of a system performing operating-mode optimization based on a signal fingerprint.

FIG. 5 illustrates an example implementation of a system 200-3 performing operating-mode optimization based on a signal fingerprint. The system 200-3 can include the fingerprint module 202, the host board 112, the interface board 210, the peripherals 114, as well as other elements of the systems 200-1 and 200-2. In operation, the fingerprint module 202 analyzes the signal fingerprint 204 to determine whether a particular peripheral 114, such as peripheral 114-3, is suboptimal. For example, the fingerprint module 202 ascertains the device 102 spends a threshold amount of time in a specific operating mode 502 based on analyzing the signal fingerprint 204, where the specific operating mode 502 is an example of the operation 206. The threshold amount of time can be based on the device 102 spending the majority of the time it is turned on in the specific operating mode 502, can mean the system 200-3 spends more time in the specific operating mode 502 than in other operating modes, can mean the system 200-3 spends a certain percentage of time in the specific operating mode 502, can mean the system 200-3 spends a certain time interval in a given period (e.g. a certain quantity of hours in a day) in the specific operating mode 502, and/or can be any other threshold amount of time. The fingerprint module 202 determines the particular peripheral 114-3 is suboptimal based on a different peripheral 114-4 of the same type 212-2 being more appropriate for the specific operating mode 502.

Consider an example in which the suboptimal peripheral 114-3 can cause the anomalous behavior 118 by being less appropriate for the specific operating mode 502. The fingerprint module 202 initiates the replacement of the particular peripheral 114-3 with a different peripheral 114-4 of the same type 212-2 based on determining that the particular peripheral 114-3 is suboptimal. According to a possible embodiment, initiating the replacement can include providing information indicating that the particular peripheral 114-3 is suboptimal. For example, the information can be output to a user 110 and the user 110 can replace the peripheral 114-3 with a more optimal peripheral 114-4. According to another possible embodiment, initiating the replacement can include disabling the suboptimal peripheral 114 and enabling a more optimal peripheral 114. For example, if the peripheral 114-1 is determined to be suboptimal, it can be replaced with the peripheral 114-2 of the same type 212-1 by disabling the peripheral 114-1 and enabling the peripheral 114-2. In particular, the hardware manager 208 can disable the peripheral 114-1 and enable the peripheral 114-2.

To elaborate, the signal fingerprint 204 can provide information, such as a baseline, that can be used to replace the peripheral 114-3 with a more optimal peripheral 114-4. For example, the signal fingerprint 204 can include power information, the fingerprint module 202 can determine the device 102 has been over-specified, and a corresponding peripheral 114-3 can be replaced with a less power-consuming, less expensive, or otherwise more optimal peripheral 114-4. According to a possible implementation, the peripheral 114-3 or the entire device 102 can typically run in a low-power mode, the corresponding fingerprint 204 can identify the low-power mode, and the peripheral 114-3 can be replaced with a more optimal peripheral 114-4.

According to a possible example of operating-mode optimization, the system 200-3 can model a device 102 and run in a normal-use scenario on a test bench 106 to determine whether the device 102 spends a majority of time in a specific operating mode 502. The signal fingerprint 204 can be used to determine that another peripheral 114-4 may be more appropriate for the device 102 than an existing peripheral 114-3. For example, the fingerprint module 202 can include a machine-learned model that is trained to determine an optimized configuration of the system 200-3 based on the signal fingerprint 204 and the system information 220.

Consider an example in which the determined optimized configuration causes the peripheral 114-3 to be replaced by the peripheral 114-4. After the replacement occurs, another fingerprint 204 can be generated to verify that the replacement peripheral 114-4 is more appropriate. For example, if the signal fingerprint 204 reveals the modeled device 102 spends the majority of its time in a low-power mode, such as a standby mode, a determination can be made that a smaller voltage regulator for lower voltages is more appropriate than a larger voltage regulator for higher voltages, and the voltage regulator can be replaced to optimize performance of the device 102.

In some cases, replacing a peripheral 114 can be automatically performed on the test bench 106 using the hardware manager 208. Replacing a peripheral 114 can also be possible for some large-scale system implementations in an operational setting (a non-test environment setting). For example, there can be a large system that is not subjected to space constraints in operation that has access to backup or replacement parts that can be automatically switched into operation when an anomaly is detected based on the signal fingerprint 204. In other cases, replacing the peripheral 114 can be a manual process performed by a test engineer on the test bench 106 or by the user 110 (or a technician) on the product 108.

Figure 6:
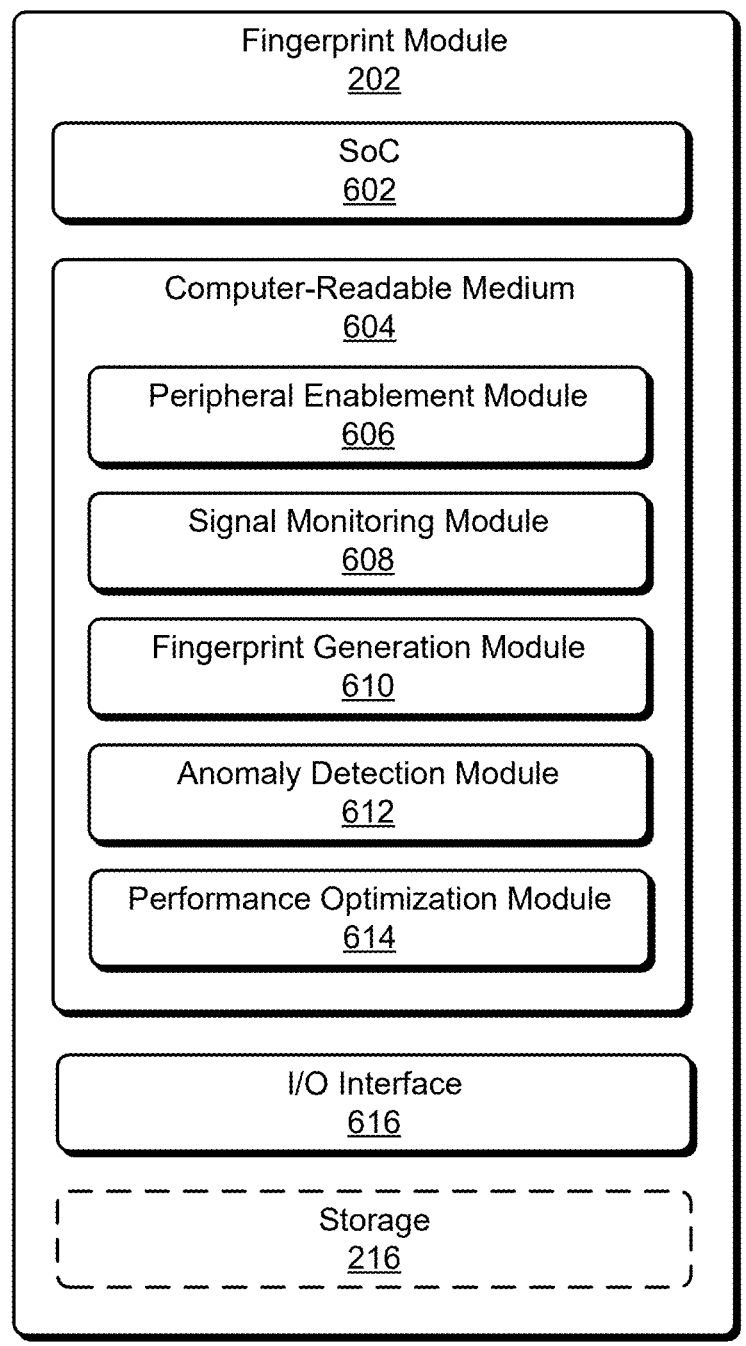
FIG. 6 illustrates an example fingerprint module that implements aspects of a signal fingerprint.

FIG. 6 illustrates an example fingerprint module 202 that implements aspects of a signal fingerprint. The fingerprint module 202 can include an SoC 602, which can also be considered a processor, a controller, and the like and can process various computer-executable instructions to control the operation of the fingerprint module 202. Alternatively or in addition, the fingerprint module 202 can be implemented with any one or combination of hardware, firmware, or fixed logic circuitry that is implemented in connection with processing and control circuits. In some implementations, the SoC 602 can be a single processor that can perform all of the operations. In other implementations, the SoC 602 can be multiple processors that may be local on the fingerprint module 202 or distributed throughout a device 102. For example, a hardware manager processor can enable and disable peripherals 114, a host board processor can initiate execution of operations, and a fingerprint module processor can monitor signals 116 and generate fingerprints 204. Although not shown, the fingerprint module 202 can include a system bus or data transfer system that couples the various components within a device. A system bus can include any one or combination of different bus structures, such as a memory bus or memory controller, a peripheral bus, a universal serial bus, and/or a processor or local bus that utilizes any of a variety of bus architectures.

The fingerprint module 202 can also include a computer-readable medium 604 and optionally the storage 216. The computer-readable medium 604 can be one or more memory devices that enable persistent and/or non-transitory data storage, such as in contrast to mere signal transmission. Examples of the computer-readable medium 604 include RAM, non-volatile memory (e.g., any one or more of a ROM, flash memory, EPROM, EEPROM, etc.), a disk storage device, an external storage, cloud storage, and/or any other computer-readable medium. The disk storage device may be implemented as any type of magnetic or optical storage device, such as a hard disk drive, a recordable and/or rewriteable CD, any type of a DVD, and the like. The computer-readable medium 604 provides data storage mechanisms to store device data, software, an operating system, various device applications, firmware, device managers, signal processing, control applications, control modules, a hardware abstraction layer for the fingerprint module 202, and any other types of software, information, and/or data related to the fingerprint module 202.

Stored applications and data can include a peripheral enablement module 606 for enabling and disabling the peripherals 114, a signal monitoring module 608 for monitoring the signals 116, a fingerprint generation module 610 for generating the signal fingerprints 204, an anomaly detection module 612 for comparing signal fingerprints 204 and detecting anomalous behavior 118, and a performance optimization module 614 for optimizing the performance of the device 102. The peripheral enablement module 606, the signal monitoring module 608, the fingerprint generation module 610, the anomaly detection module 612, and the performance optimization module 614, other aspects of the fingerprint module 202, and other elements can also be stored on the storage 216, implemented as circuitry, implemented as logic, and/or implemented as other hardware and/or software for enabling software-defined hardware. An I/O interface 616 can provide an interface for interconnects, a user input and output interface, a data transfer interface, a wired network interface, a wireless network interface, a power interface, and/or any other interface for input signals, output signals, power signals, and other signals.

In certain aspects, peripheral enablement module 606, the signal monitoring module 608, the fingerprint generation module 610, the anomaly detection module 612, and the performance optimization module 614 can include instructions that, when executed by the SoC 602, perform operations corresponding to the respective modules. For example, the SoC 602 can be a processor and the computer-readable medium 604 can be a memory coupled to the processor, the memory having instructions stored thereon that, responsive to execution by the processor, perform operations of the modules and other operations.

In particular, the peripheral enablement module 606 can include instructions that, when executed by the SoC 602, enable a plurality of peripherals for a configuration of a device 102. Each enabled peripheral 114 is enabled from a group of peripherals corresponding to a peripheral type 212, where each group of peripherals is coupled to the host board 112.

The signal monitoring module 608 can include instructions that, when executed by the SoC 602, monitor, during the operation 206 performed by the host board 112 using at least one peripheral 114 of the enabled plurality of peripherals, at least one signal 116 that propagates between the host board 112 and the at least one peripheral 114. Monitoring can include measuring voltages and/or currents of power signals 116-1 distributed between the host board 112 and the at least one peripheral 114. Monitoring can also include monitoring at least one communication signal 116-2 communicated between the host board 112 and the at least one peripheral 114.

The fingerprint generation module 610 can include instructions that, when executed by the SoC 602, generate one or more signal fingerprints 204 for the operation 206 performed by the host board 112 using the at least one peripheral 114 based on monitoring the at least one signal 116. The signal fingerprint 204 represents at least one signal characteristic 218 of the at least one signal 116 corresponding to the operation 206.

Generating the signal fingerprint 204 can include generating a peripheral signal fingerprint 204-2 for the operation 206 performed by the host board 112 using the at least one peripheral 114 based on monitoring the at least one signal 116. The peripheral signal fingerprint 204-2 represents signal characteristics 218 of the at least one signal 116 corresponding to the at least one peripheral 114 during the operation 206. Generating the signal fingerprint 204 can also include generating an operation signal fingerprint 204-3 based on monitoring the signals 116 between the host board 112 and the plurality of peripherals. The operation signal fingerprint 204-3 represents the signal characteristics 218 of the signals 116 during the operation 206.

To generate the signal fingerprint 204, the fingerprint generation module 610 can collect data corresponding to the at least one signal characteristic 218 of the at least one signal 116. The collected data is labeled based on the operation 206 and the configuration 306 of the device 102. A relationship is established between the labeled data and the fingerprint 204 is generated for the operation 206 based on the relationship between the labeled data.

In a possible embodiment, the operation 206 can be a current operation, and the signal monitoring module 608 monitors, during a previous operation performed by the host board 112, at least one previous signal 116 that propagates between the host board 112 and the at least one peripheral 114. The fingerprint generation module 610 generates the reference signal fingerprint 204-5 based on monitoring the at least one previous signal 116. The reference signal fingerprint 204-5 represents at least one signal characteristic 218 of the at least one previous signal 116 corresponding to the previous operations performed by the host board 112. The reference signal fingerprint 204-5 is stored in the storage 216.

The anomaly detection module 612 can include instructions that, when executed by the SoC 602 compare the generated signal fingerprint 204-1 to the stored reference signal fingerprint 204-5. The anomaly detection module 612 detects an anomaly of the operation 206 based on comparing the generated signal fingerprint 204-1 to the stored reference signal fingerprint 204-5. For example, a relationship can be established between each of a plurality of generated signal fingerprints 204-1 and the reference signal fingerprint 204-5. The anomaly can be detected based on the relationship between each of the plurality of generated signal fingerprints 204-1 and the reference signal fingerprint 204-5.

In a possible implementation, the anomaly detection module 612 determines that the current operation 206 is a different operation from the previous operation based on detecting the anomaly. The current operation 206 can be different due to a software bug in the current operation 206, due to malware masquerading as an expected current operation, or due to other reasons. The anomaly detection module 612 blocks execution of the current operation 206 by the host board 112 based on the current operation 206 being a different operation from the previous operation.

The performance optimization module 614 can include instructions that, when executed by the SoC 602, analyze the signal fingerprint 204 to determine whether a particular peripheral 114-2 is suboptimal. Analyzing can include ascertaining the device 102 spends a threshold amount of time in a specific operating mode 502. Analyzing can also include determining the particular peripheral 114-2 is suboptimal based on a different peripheral 114-3 being more appropriate for the specific operating mode 502. The performance optimization module 614 can initiate replacement of the particular peripheral 114-2 with a different peripheral 114-3 of a same type based 212-2 on determining the particular peripheral 114-2 is suboptimal. Replacement can be initiated by providing information indicating the particular peripheral 114-2 is suboptimal.

In a possible embodiment, the signal fingerprint 204 is a first signal fingerprint and the at least one signal 116 is at least one first signal. The peripheral enablement module 606 disables a first peripheral 114-1 of the enabled plurality of peripherals, where the first peripheral has a peripheral type 212-1. The peripheral enablement module 606 enables a second peripheral 114-2 of a corresponding group of peripherals that have the same peripheral type 212-1 as the disabled first peripheral 114-1. The signal monitoring module 608 monitors, during subsequent execution of the operation 206 performed by the host board 112 using the second peripheral 114-2, at least one second signal 116 that propagates between the host board 112 and the second peripheral 114-2. The fingerprint generation module 610 generates a second signal fingerprint 204 for the subsequent execution of the operation 206 on the device 102 with the enabled second peripheral 114-2 based on monitoring the at least one second signal 116. The second signal fingerprint 204 represents at least one signal characteristic 218 of the at least one second signal corresponding to the subsequent execution of the operation 206. In this manner, different signal fingerprints 204 can be generated for the same operation 206 performed using different combinations of peripherals 114.

Figure 7:
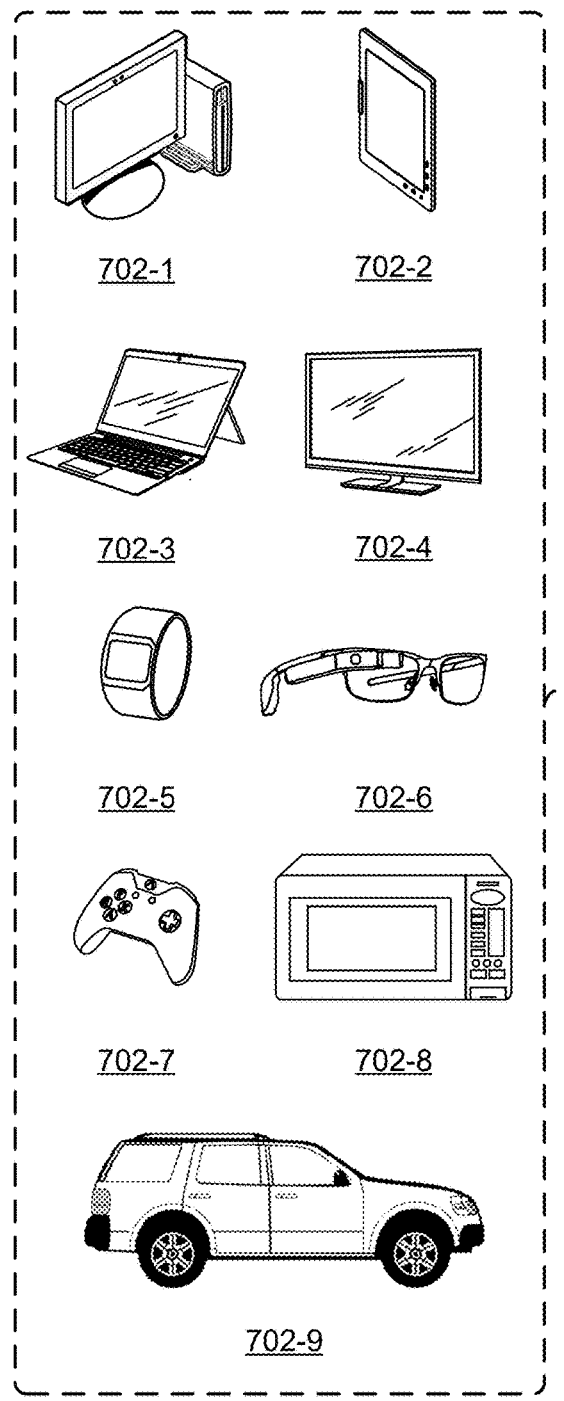
FIG. 7 illustrates an example implementation of a product that incorporates aspects of signal fingerprints.
Figure 7:
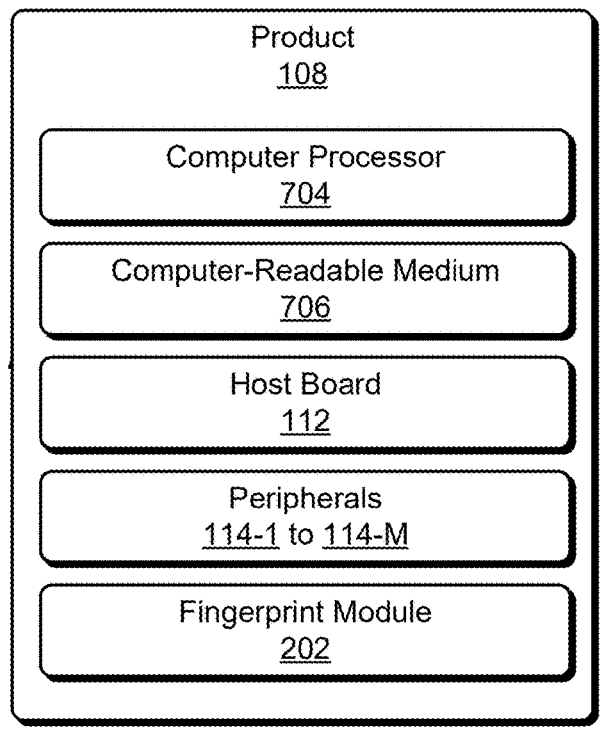

FIG. 7 illustrates an example implementation of a product 108 that incorporates aspects of signal fingerprints. The product 108 is illustrated with various non-limiting example devices including a desktop computer 702-1, a tablet 702-2, a laptop 702-3, a television 702-4, a computing watch 702-5, computing glasses 702-6, a gaming system 702-7, a microwave 702-8, and a vehicle 702-9. Other devices may also be a product 108, such as a home service device, a smart speaker, a smart thermostat, a baby monitor, a Wi-Fi™ router, a drone, a trackpad, a drawing pad, a netbook, an electronic reader, a home automation and control system, a wall display, a home appliance, or any other electronic device.

The product 108 can include one or more computer processors 704 and at least one computer-readable medium 706 that includes software and data. Applications and/or an operating system embodied as computer-readable instructions on the computer-readable medium 706 can be executed by the computer processor 704 to provide some of the functionalities described herein.

The product 108 can also include the host board 112, a group of the peripherals 114-1 to 114-M, and the fingerprint module 202. The variable M represents a positive integer. The product 108 can be the result of the host board 112 combined with a chosen group of peripherals 114-1 to 114-M that meet product requirements, such as identified by the configuration 306. The fingerprint module 202 can be included with the product 108 to provide for fingerprint generation, fingerprint analysis, anomalous behavior detection, and operation blocking as described above with respect to the system 200.

In a possible embodiment, the product 108 can receive the anomaly information 222 that identifies corrupted software, such as in the form of malware or in the form of the software including a bug. In this example, anomaly information 222 can include a full or stripped-down version of the signal fingerprint 204 and/or can include other information, such as a software version, a software identifier, characteristics of the operation 206, and/or other information. The fingerprint module 202 can use the anomaly information 222 to detect an event or signal that is unique to the corrupted software and block the corrupted software.

Example Method

FIG. 8 depicts an example method 800 for implementing aspects of signal fingerprints. The method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to entities detailed in the environments 100 of FIG. 1 and the system 200 of FIGS. 2, 3, and 5, reference to which is made for example only. The method 800 can be performed, at least partially, by the fingerprint module 202, but the techniques are not limited to performance by one entity or multiple entities operating on one device.

At 802, a plurality of peripherals for a configuration of an electronic device are enabled. Each enabled peripheral is enabled from a group of peripherals corresponding to a peripheral type. Each group of peripherals is coupled to a host board. For example, the fingerprint module 202 and/or the hardware manager 208 enable a plurality of peripherals for a configuration of a device 102. Each enabled peripheral 114 is enabled from a group of peripherals corresponding to a peripheral type 212. Each group of peripherals is coupled to a host board 112.

At 804, at least one signal that propagates between the host board and the at least one peripheral is monitored during an operation performed by the host board using at least one peripheral of the enabled plurality of peripherals. For example, the fingerprint module 202 monitors, during the operation 206 performed by the host board 112 using at least one peripheral 114 of the enabled plurality of peripherals, at least one signal 116 that propagates between the host board 112 and the at least one peripheral 114. In some cases, monitoring includes measuring voltages and/or currents of at least one power signal 116-1 distributed between the host board 112 and the at least one peripheral 114. In other cases, at least one communication signal 116-2 communicated between the host board 112 and the at least one peripheral 114 is monitored. Monitoring of the communication signal 116-2 can also include measuring voltages, currents, and/or other aspects of the communication signal 116-2. In still other cases, the monitoring can include monitoring multiple power signals 116-1, multiple communication signals 116-2, or at least one power signal 116-1 and at least one communication signal 116-2.

At 806, a signal fingerprint is generated based on monitoring the at least one signal for the operation performed by the host board using the at least one peripheral. The signal fingerprint represents at least one characteristic of the at least one signal corresponding to the operation. For example, the fingerprint module 202 generates one or more signal fingerprints 204 for the operation 206 performed by the host board 112 using the at least one peripheral 114 based on monitoring the at least one signal 116. The signal fingerprint 204 represents at least one signal characteristic 218 of the at least one signal 116 corresponding to the operation 206.

In some cases, generating the signal fingerprint 204 includes generating a peripheral signal fingerprint 204-2 for the operation 206 performed by the host board 112 using the at least one peripheral 114 based on monitoring the at least one signal 116. The peripheral signal fingerprint 204-2 represents characteristics 218 of the at least one signal 116 corresponding to the peripheral during the operation 206. In one example, generating the signal fingerprint 204 includes generating an operation signal fingerprint 204-3 based on monitoring the signals 116 between the host board 112 and the plurality of peripherals. The operation signal fingerprint 204-3 represents characteristics 218 of the signals 116 during the operation 206. Additionally or alternatively, the generating of the signal fingerprint 204 can refer to generating a reference fingerprint 204-5.

According to a possible implementation, to generate the signal fingerprint 204, the fingerprint generation module 610 collects data corresponding to the at least one signal characteristic 218 of the at least one signal 116. The collected data is labeled based on the operation 206 and the configuration 306 of the device 102. A relationship is established between the labeled data. The fingerprint 204 is generated for the operation 206 based on the relationship between the labeled data.

In a possible embodiment, the operation 206 is a current operation, and the signal monitoring module 608 monitors, during a previous operation performed by the host board 112, at least one previous signal that propagates between the host board 112 and the at least one peripheral 114. The fingerprint generation module 610 generates the reference signal fingerprint 204-5 based on monitoring the at least one previous signal. The reference signal fingerprint 204-5 represents at least one signal characteristic 218 of the at least one previous signal corresponding to the previous operations performed by the host board 112. The reference signal fingerprint 204-5 is stored in the storage 216.

According to a possible embodiment, the fingerprint module 202 compares the generated signal fingerprint 204-1 to the stored reference signal fingerprint 204-5. An anomaly of the operation 206 is detected based on comparing the generated signal fingerprint 204-1 to the stored reference signal fingerprint 204-5. For example, a relationship is established between each of a plurality of generated signal fingerprints 204-1 and the reference signal fingerprint 204-5. Anomalous behavior 118 is detected based on the relationship between each of the plurality of generated signal fingerprints 204-1 and the reference signal fingerprint 204-5.

In a possible implementation, the fingerprint module 202 determines that the current operation 206 is a different operation from the previous operation based on detecting the anomaly. The current operation 206 can be different due to a software bug in the current operation 206 or due to malware masquerading as an expected current operation. The fingerprint module 202 blocks execution of the current operation 206 by the host board 112 based on the current operation 206 being a different operation from the previous operation.

In some cases, the fingerprint module 202 analyzes the signal fingerprint 204 to determine whether a particular peripheral 114-2 is suboptimal. For example, analyzing includes ascertaining the device 102 spends a threshold amount of time in a specific operating mode 502. Analyzing also includes determining the particular peripheral 114-1 is suboptimal based on a different peripheral 114-2 being more appropriate for the specific operating mode 502. The fingerprint module 202 initiates replacement of the particular peripheral 114-1 with a different peripheral 114-2 of a same type 212-1 based on determining the particular peripheral 114-1 is suboptimal. In a possible example, replacement is initiated by providing information indicating the particular peripheral 114-2 is suboptimal.

In a possible embodiment, the signal fingerprint 204 is a first signal fingerprint and the at least one signal 116 at least one first signal. The fingerprint module 202 disables a first peripheral 114-1 of the enabled plurality of peripherals, the first peripheral 114-1 having a peripheral type 212-1. The fingerprint module 202 enables a second peripheral 114-2 of a corresponding group of peripherals that have the same peripheral type 212-1 as the disabled first peripheral 114-1. The fingerprint module 202 monitors, during subsequent execution of the operation 206 performed by the host board 112 using the second peripheral 114-2, at least one second signal that propagates between the host board 112 and the second peripheral 114-2. The fingerprint module 202 generates a second signal fingerprint for the subsequent execution of the operation 206 on the device 102 with the enabled second peripheral 114-2 based on monitoring the at least one second signal. The second signal fingerprint 204 represents at least one signal characteristic 218 of the at least one second signal corresponding to the subsequent execution of the operation 206.

Embodiments can provide for associating at least one power signal 116-1 and/or at least one communication signal 116-2 on a device 102 with operation behavior. The at least one power signal 116-1 and/or at least one communication signal 116-2 can include different combinations of power and communication signals all the way up to every signal in the device 102. Fingerprints 204 of particular operation behavior on particular combinations of peripherals 114 can be created based on the signals 116 traced on the device 102. The fingerprints 204 can be used for anomalous behavior 118 detection, such as fraud detection, bug detection, regression testing, and other reasons. The fingerprints 204 and anomaly information 222 can be used for blocking anomalous behavior 118, selection of optimal peripherals, and other purposes.

By detecting and/or blocking anomalous behavior 118, as well as determining appropriate peripherals for a device 102, the system 200 including the fingerprint module 202 can improve user experience by protecting devices 102 from anomalous or known behavior, by improving reliability, and by further reducing costs and time associated with design and testing phases of devices 102 through appropriate component selection.

CONCLUSION

Although techniques using, and apparatuses including, a signal fingerprint have been described in language specific to features and/or methods, it is to be understood that the subject of the appended claims is not necessarily limited to the specific features or methods described. Rather, the specific features and methods are disclosed as example implementations of a signal fingerprint.

Some Examples are described below.

Example 1: A method comprising:
enabling a plurality of peripherals for a configuration of an electronic device, where each enabled peripheral is enabled from a group of peripherals corresponding to a peripheral type, where each group of peripherals is coupled to a host board;
monitoring, during an operation performed by the host board using at least one peripheral of the enabled plurality of peripherals, at least one signal that propagates between the host board and the at least one peripheral; and
generating a signal fingerprint for the operation performed by the host board using the at least one peripheral based on monitoring the at least one signal, the signal fingerprint representing at least one characteristic of the at least one signal corresponding to the operation.

Example 2: The method of example 1, wherein generating comprises generating a peripheral signal fingerprint for the operation performed by the host board using the at least one peripheral based on monitoring the at least one signal, where the peripheral signal fingerprint represents characteristics of the at least one signal corresponding to the at least one peripheral during the operation.

Example 3: The method of any previous example, wherein generating comprises generating an operation signal fingerprint based on monitoring signals between the host board and the plurality of peripherals, the operation signal fingerprint representing characteristics of the signals during the operation.

Example 4: The method of any previous example, wherein monitoring comprises measuring at least one selected from voltages and currents of power signals distributed between the host board and the at least one peripheral.

Example 5: The method of any previous example, wherein monitoring comprises monitoring at least one communication signal communicated between the host board and the at least one peripheral.

Example 6: The method of any previous example, wherein:
monitoring comprises monitoring, during different operations performed by the host board with the enabled plurality of peripherals, at least one signal that propagates between the host board and the at least one peripheral, generating comprises generating a different signal fingerprint for each different operation performed by the host board with the enabled plurality of peripherals, and the method comprises storing each different signal fingerprint.

Example 7: The method of any previous example, further comprising:
storing a reference signal fingerprint;
comparing the generated signal fingerprint to the stored reference signal fingerprint; and
detecting an anomaly of the operation based on comparing the generated signal fingerprint to the stored reference signal fingerprint.

Example 8: The method of example 7, wherein:
the operation comprises a current operation, and
the method further comprises:
monitoring, during a previous operation performed by the host board, at least one previous signal that propagates between the host board and the at least one peripheral; and generating the reference signal fingerprint based on monitoring the at least one previous signal, the reference signal fingerprint representing at least one characteristic of the at least one previous signal corresponding to the previous operation performed by the host board.

Example 9: The method of example 8, further comprising:
determining that the current operation is a different operation from the previous operation based on detecting the anomaly; and
blocking execution of the current operation by the host board based on the current operation being a different operation from the previous operation.

Example 10: The method of example 9, wherein the current operation is different due to a software bug in the current operation or due to malware masquerading as an expected current operation.

Example 11: The method of example 7, wherein:
generating the generated signal fingerprint comprises generating a plurality of generated signal fingerprints,
the method further comprises establishing a relationship between each of the plurality of generated signal fingerprints and the reference signal fingerprint, and
detecting the anomaly comprises detecting the anomaly based on the relationship between each of the plurality of generated signal fingerprints and the reference signal fingerprint.

Example 12: The method of any previous example, wherein generating the fingerprint comprises:
collecting data corresponding to the at least one characteristic of the at least one signal;
labeling the collected data based on the operation and the configuration of the electronic device;
establishing a relationship between the labeled data; and
generating the fingerprint for the operation based on the relationship between the labeled data.

Example 13: The method of any previous example, wherein:
the signal fingerprint comprises a first signal fingerprint and the at least one signal comprises at least one first signal;
the method further comprises:
disabling a first peripheral of the enabled plurality of peripherals, the first peripheral having a peripheral type;
enabling a second peripheral of a corresponding group of peripherals, the enabled second peripheral having a same peripheral type as the disabled first peripheral;
monitoring, during subsequent execution of the operation performed by the host board using the second peripheral, at least one second signal that propagates between the host board and the second peripheral; and
generating a second signal fingerprint for the subsequent execution of the operation on the electronic device with the enabled second peripheral based on monitoring the at least one second signal, the second signal fingerprint representing at least one characteristic of the at least one second signal corresponding to the subsequent execution of the operation.

Example 14: The method of any previous example, further comprising:
analyzing the signal fingerprint to determine whether a particular peripheral is suboptimal; and
initiating replacement of the particular peripheral with a different peripheral of a same type based on determining the particular peripheral is suboptimal.

Example 15: The method of example 14,
wherein analyzing the fingerprint comprises:
ascertaining the electronic device spends a threshold amount of time in a specific operating mode; and
determining the particular peripheral is suboptimal based on a different peripheral being more appropriate for the specific operating mode, and
wherein initiating replacement comprises providing information indicating the particular peripheral is suboptimal.

Example 16. A computing system comprising:
a processor; and
a memory coupled to the processor, the memory having instructions stored thereon that, responsive to execution by the processor, perform operations comprising:
  enabling a plurality of peripherals for a configuration of an electronic device, where each enabled peripheral is enabled from a group of peripherals corresponding to a peripheral type, where each group of peripherals is coupled to a host board;
  monitoring, during an operation performed by the host board using at least one peripheral of the enabled plurality of peripherals, at least one signal that propagates between the host board and the at least one peripheral; and
  generating a signal fingerprint for the operation performed by the host board using the at least one peripheral based on monitoring the at least one signal, the signal fingerprint representing at least one characteristic of the at least one signal corresponding to the operation.

Example 17: The computing system of example 16, wherein the instructions perform operations comprising:
storing a reference signal fingerprint;
comparing the generated signal fingerprint to the stored reference signal fingerprint; and
detecting an anomaly of the operation based on comparing the generated signal fingerprint to the stored reference signal fingerprint.

Example 18: The computing system of example 16 or 17, wherein generating the fingerprint comprises:
collecting data corresponding to the at least one characteristic of the at least one signal;
labeling the collected data based on the operation and the configuration of the electronic device;
establishing a relationship between the labeled data; and
generating the fingerprint for the operation based on the relationship between the labeled data.

Example 19: The computing system of any one of examples 16-18, wherein the instructions perform operations comprising:
analyzing the signal fingerprint to determine whether a particular peripheral is suboptimal; and
initiating replacement of the particular peripheral with a different peripheral of a same type based on determining the particular peripheral is suboptimal.

Example 20: A computer-readable storage medium comprising instructions that, responsive to execution by a processor, cause the processor to:
  enable a plurality of peripherals for a configuration of an electronic device, where each enabled peripheral is enabled from a group of peripherals corresponding to a peripheral type, where each group of peripherals is coupled to a host board;
  monitor, during an operation performed by the host board using at least one peripheral of the enabled plurality of peripherals, at least one signal that propagates between the host board and the at least one peripheral; and
  generate a signal fingerprint for the operation performed by the host board using the at least one peripheral based on monitoring the at least one signal, the signal fingerprint representing at least one characteristic of the at least one signal corresponding to the operation.

What is claimed is:

1. A method comprising:
enabling a plurality of peripherals for a configuration of an electronic device, where each enabled peripheral is enabled from a group of peripherals corresponding to a peripheral type, where each group of peripherals is coupled to a host board;
monitoring, during an operation performed by the host board using at least one peripheral of the enabled plurality of peripherals, at least one signal that propagates between the host board and the at least one peripheral; and
generating a signal fingerprint for the operation performed by the host board using the at least one peripheral based on monitoring the at least one signal, the signal fingerprint representing at least one characteristic of the at least one signal corresponding to the operation.

2. The method of claim 1, wherein generating comprises generating a peripheral signal fingerprint for the operation performed by the host board using the at least one peripheral based on monitoring the at least one signal, where the peripheral signal fingerprint represents characteristics of the at least one signal corresponding to the at least one peripheral during the operation.

3. The method of claim 1, wherein generating comprises generating an operation signal fingerprint based on monitoring signals between the host board and the plurality of peripherals, the operation signal fingerprint representing characteristics of the signals during the operation.

4. The method of claim 1, wherein monitoring comprises measuring at least one selected from voltages and currents of power signals distributed between the host board and the at least one peripheral.

5. The method of claim 1, wherein monitoring comprises monitoring at least one communication signal communicated between the host board and the at least one peripheral.

6. The method of claim 1, wherein:
monitoring comprises monitoring, during different operations performed by the host board with the enabled plurality of peripherals, at least one signal that propagates between the host board and the at least one peripheral,
generating comprises generating a different signal fingerprint for each different operation performed by the host board with the enabled plurality of peripherals, and
the method comprises storing each different signal fingerprint.

7. The method of claim 1, further comprising:
storing a reference signal fingerprint;
comparing the generated signal fingerprint to the stored reference signal fingerprint; and
detecting an anomaly of the operation based on comparing the generated signal fingerprint to the stored reference signal fingerprint.

8. The method of claim 7, wherein:
the operation comprises a current operation, and
the method further comprises:
  monitoring, during a previous operation performed by the host board, at least one previous signal that propagates between the host board and the at least one peripheral; and
  generating the reference signal fingerprint based on monitoring the at least one previous signal, the reference signal fingerprint representing at least one characteristic of the at least one previous signal corresponding to the previous operation performed by the host board.

9. The method of claim 8, further comprising:
determining that the current operation is a different operation from the previous operation based on detecting the anomaly; and
blocking execution of the current operation by the host board based on the current operation being a different operation from the previous operation.

10. The method of claim 9, wherein the current operation is different due to a software bug in the current operation or due to malware masquerading as an expected current operation.

11. The method of claim 7, wherein:
generating the generated signal fingerprint comprises generating a plurality of generated signal fingerprints,
the method further comprises establishing a relationship between each of the plurality of generated signal fingerprints and the reference signal fingerprint, and
detecting the anomaly comprises detecting the anomaly based on the relationship between each of the plurality of generated signal fingerprints and the reference signal fingerprint.

12. The method of claim 1, wherein generating the fingerprint comprises:
  collecting data corresponding to the at least one characteristic of the at least one signal;
  labeling the collected data based on the operation and the configuration of the electronic device;
  establishing a relationship between the labeled data; and
  generating the fingerprint for the operation based on the relationship between the labeled data.

13. The method of claim 1, wherein:
the signal fingerprint comprises a first signal fingerprint and the at least one signal comprises at least one first signal;
the method further comprises:
  disabling a first peripheral of the enabled plurality of peripherals, the first peripheral having a peripheral type;
  enabling a second peripheral of a corresponding group of peripherals, the enabled second peripheral having a same peripheral type as the disabled first peripheral;
  monitoring, during subsequent execution of the operation performed by the host board using the second peripheral, at least one second signal that propagates between the host board and the second peripheral; and
  generating a second signal fingerprint for the subsequent execution of the operation on the electronic device with the enabled second peripheral based on monitoring the at least one second signal, the second signal fingerprint representing at least one characteristic of the at least one second signal corresponding to the subsequent execution of the operation.

14. The method of claim 1, further comprising:
analyzing the signal fingerprint to determine whether a particular peripheral is suboptimal; and
initiating replacement of the particular peripheral with a different peripheral of a same type based on determining the particular peripheral is suboptimal.

15. The method of claim 14,
wherein analyzing the fingerprint comprises:
  ascertaining the electronic device spends a threshold amount of time in a specific operating mode; and
  determining the particular peripheral is suboptimal based on a different peripheral being more appropriate for the specific operating mode, and
wherein initiating replacement comprises providing information indicating the particular peripheral is suboptimal.

16. A computing system comprising:
a processor; and
a memory coupled to the processor, the memory having instructions stored thereon that, responsive to execution by the processor, perform operations comprising:
  enabling a plurality of peripherals for a configuration of an electronic device, where each enabled peripheral is enabled from a group of peripherals corresponding to a peripheral type, where each group of peripherals is coupled to a host board;
  monitoring, during an operation performed by the host board using at least one peripheral of the enabled plurality of peripherals, at least one signal that propagates between the host board and the at least one peripheral; and
  generating a signal fingerprint for the operation performed by the host board using the at least one peripheral based on monitoring the at least one signal, the signal fingerprint representing at least one characteristic of the at least one signal corresponding to the operation.

17. The computing system of claim 16, wherein the instructions perform operations comprising:
  storing a reference signal fingerprint;
  comparing the generated signal fingerprint to the stored reference signal fingerprint; and
  detecting an anomaly of the operation based on comparing the generated signal fingerprint to the stored reference signal fingerprint.

18. The computing system of claim 16, wherein generating the fingerprint comprises:
  collecting data corresponding to the at least one characteristic of the at least one signal;
  labeling the collected data based on the operation and the configuration of the electronic device;
  establishing a relationship between the labeled data; and
  generating the fingerprint for the operation based on the relationship between the labeled data.

19. The computing system of claim 16, wherein the instructions perform operations comprising:
  analyzing the signal fingerprint to determine whether a particular peripheral is suboptimal; and
  initiating replacement of the particular peripheral with a different peripheral of a same type based on determining the particular peripheral is suboptimal.

20. A computer-readable storage medium comprising instructions that, responsive to execution by a processor, cause the processor to:
  enable a plurality of peripherals for a configuration of an electronic device, where each enabled peripheral is enabled from a group of peripherals corresponding to a peripheral type, where each group of peripherals is coupled to a host board;

monitor, during an operation performed by the host board using at least one peripheral of the enabled plurality of peripherals, at least one signal that propagates between the host board and the at least one peripheral; and generate a signal fingerprint for the operation performed by the host board using the at least one peripheral based on monitoring the at least one signal, the signal fingerprint representing at least one characteristic of the at least one signal corresponding to the operation.

* * * * *